(12) United States Patent
Deininger et al.

(10) Patent No.: US 11,348,771 B2
(45) Date of Patent: May 31, 2022

(54) MASS SPECTROMETRIC DETERMINATION OF PARTICULAR TISSUE STATES

(71) Applicant: Bruker Daltonik GmbH, Bremen (DE)

(72) Inventors: Sören-Oliver Deininger, Leipzig (DE); Martin Schürenberg, Tarmstedt (DE)

( * ) Notice: Subject to any disclaimer, the term of this patent is extended or adjusted under 35 U.S.C. 154(b) by 0 days.

(21) Appl. No.: 17/095,908

(22) Filed: Nov. 12, 2020

(65) Prior Publication Data
US 2021/0074532 A1 Mar. 11, 2021

Related U.S. Application Data

(62) Division of application No. 16/201,158, filed on Nov. 27, 2018, now Pat. No. 10,886,115.

(30) Foreign Application Priority Data

Dec. 14, 2017 (DE) .......................... 102017129891.6

(51) Int. Cl.
| | |
|---|---|
| *H01J 49/00* | (2006.01) |
| *H01J 49/04* | (2006.01) |
| *G01N 1/28* | (2006.01) |
| *H01J 49/40* | (2006.01) |
| *H01J 49/16* | (2006.01) |

(52) U.S. Cl.
CPC ........ *H01J 49/0004* (2013.01); *G01N 1/2813* (2013.01); *H01J 49/0036* (2013.01); *H01J 49/0418* (2013.01); *H01J 49/164* (2013.01); *H01J 49/40* (2013.01)

(58) Field of Classification Search
CPC ................ G01N 1/2813; H01J 49/0004; H01J 49/0036; H01J 49/0418; H01J 49/164; H01J 49/40
See application file for complete search history.

(56) References Cited

U.S. PATENT DOCUMENTS

| | | | | |
|---|---|---|---|---|
| 7,873,478 | B2 * | 1/2011 | Suckau ................ | G01N 33/483 250/281 |
| 8,063,359 | B2 * | 11/2011 | Sigman .............. | G01N 30/7206 250/282 |

(Continued)

FOREIGN PATENT DOCUMENTS

| | | |
|---|---|---|
| CN | 104380430 A | 2/2015 |
| CN | 105321795 B | 10/2018 |

OTHER PUBLICATIONS

Sparvero, Louis J., et al., "Mapping of phospholipids by MALDI imaging (MALDI-MSI): realities and expectations", Chemistry and Physics of Lipids, (2012) pp. 545-562.

*Primary Examiner* — Wyatt A Stoffa
(74) *Attorney, Agent, or Firm* — Benoit & Côté Inc.

(57) ABSTRACT

The invention relates to the identification and visualization of the spatial distribution of particular tissue states in histological tissue sections from mass spectrometric signals acquired with spatial resolution. The invention proposes a method by means of which regions of the tissue with similar mass spectra are found automatically, and it is further proposed that mass spectra of these regions are summed in order to improve the spectral quality to such an extent that known markers for tissue degenerations can be identified with increased certainty. Regions of similar mass spectra can be interconnected on a large scale, but can also be isolated from each other on a small scale.

28 Claims, 3 Drawing Sheets

(56) References Cited

U.S. PATENT DOCUMENTS

| | | | |
|---|---|---|---|
| 8,274,045 B2* | 9/2012 | Bamberger | H01J 49/025 250/281 |
| 8,605,968 B2* | 12/2013 | Alexandrov | G06V 20/695 382/128 |
| 8,706,426 B2* | 4/2014 | Sigman | G06K 9/6247 702/28 |
| 9,230,319 B2* | 1/2016 | Tanji | G06T 7/0012 |
| 9,263,242 B2* | 2/2016 | Makarov | H01J 49/40 |
| 10,197,576 B2* | 2/2019 | Suckau | G01N 33/6848 |
| 10,312,067 B2* | 6/2019 | Ikegami | H01J 49/0004 |
| 2006/0063145 A1* | 3/2006 | Suckau | G01N 33/483 702/19 |
| 2008/0296488 A1* | 12/2008 | Hoile | H01J 49/004 250/283 |
| 2009/0090857 A1* | 4/2009 | Sigman | G01N 30/7206 250/281 |
| 2009/0261243 A1* | 10/2009 | Bamberger | H01J 49/40 250/288 |
| 2009/0289184 A1* | 11/2009 | Deininger | G06K 9/00523 250/282 |
| 2011/0127425 A1* | 6/2011 | Kajihara | H01J 49/004 250/288 |
| 2011/0280455 A1* | 11/2011 | Alexandrov | H01J 49/0036 382/128 |
| 2012/0016598 A1 | 1/2012 | Deininger et al. | |
| 2013/0080072 A1 | 3/2013 | Ikegami | |
| 2013/0320203 A1 | 12/2013 | Röder et al. | |
| 2018/0047553 A1* | 2/2018 | Richardson | G01N 9/00 |
| 2018/0103935 A1* | 4/2018 | Pringle | G01N 33/92 |
| 2019/0096650 A1* | 3/2019 | Deininger | G01N 33/6851 |
| 2020/0402785 A1* | 12/2020 | Richardson | A61B 10/0041 |
| 2021/0265148 A1* | 8/2021 | Green | H01J 49/0036 |

\* cited by examiner

MASS SPECTROMETRIC DETERMINATION OF PARTICULAR TISSUE STATES

BACKGROUND OF THE INVENTION

Field of the Invention

This invention relates to the determination and visualization of the spatial distribution of particular tissue states, for example oncological tissue degenerations, in histological tissue sections from spatially resolved mass spectrometric signals.

Description of the Related Art

Spatially resolved mass spectra of a thin tissue section may be obtained by imaging mass spectrometric analysis (i.e., "Imaging Mass Spectrometry", or "IMS"). As shown in FIG. 1A, a thin tissue section (10) is produced, for example using a microtome, from a deep frozen piece of tissue of an organ of interest from a human, animal or even plant individual, and is put onto a specimen slide (30). When a MALDI method is used for ionization (MALDI=ionization by matrix-assisted laser desorption), a matrix (60) which absorbs laser energy is subsequently applied to the surface of the specimen. This can be done by the intermittent spraying of a matrix solution (50) from an appropriate dispenser (40) onto the thin tissue section (10), as shown in FIG. 1 B). Examples of such a method are described, for example, in patent documents DE 10 2006 019 530 B4, GB 2 437 623 B, and U.S. Pat. No. 7,667,196 B2 (M. SchUrenberg). The raster scan method has become established for the subsequent mass spectrometric acquisition.

The raster scan method involves scanning a thin tissue section with focused laser beam pulses (70) in a MALDI mass spectrometer to produce a one- or two-dimensional intensity profile for the tissue components, which are shown in the resulting mass spectra (200) (FIG. 1C). A method of this type is described in patent document U.S. Pat. No. 5,808,300 to F. Caprioli. Each raster spot is therefore irradiated at least once with a finely focused pulse of laser light (70) and provides a mass spectrum which can cover a wide range of molecular weights, for example 1 to 30 kilodaltons (1 dalton=1 atomic mass unit u). In modern time-of-flight mass spectrometers, a raster spot can have a diameter of only around 5 micrometers, and up to ten thousand mass spectra (200) per second can be acquired. Fine raster spots of around 5 micrometers in diameter increase the ion yield (80) per analyte molecule and are therefore to be preferred in principle. Only a very small number of mass spectra (200) can be acquired from such a fine raster spot, however, because the material of the thin tissue section is used up by the continuing irradiation with laser light.

A method which improves the spectral quality consists in dividing up the tissue surface into slightly larger pixels, and generating a mass spectrum of better quality for each of these pixels. Each larger pixel can be sampled in the raster scan, for example, and all the mass spectra from this pixel can be summed, irrespective of tissue type. Mass spectra of smaller areas within the larger pixel, obtained by means of a fine raster scan are simply summed. The mass spectra of the pixels can also be generated by laser spots that are the size of the pixels, however, and be acquired with many repeats of the laser shots onto the same target area, a better quality mass spectrum being created by summation. The pixels are preferably square in order to cover the tissue completely; they can have edge lengths of 10 micrometers to 200 micrometers.

So-called "mass images" can be generated from the mass spectra of the pixels by appropriate software. This involves selecting an ion mass which characterizes a peptide or a protein, or a small mass range around this mass, in the spectra and displaying its intensity distribution graphically over the area of the thin tissue section. This has made it possible for the distribution of neuropeptides in rat brains to be correlated with specific morphological peculiarities, for example, or for the distribution of ß-amyloid peptides in the brain of Alzheimer animal models to be depicted.

A significant disadvantage of this simple method with mass images consists in the fact that only a small number of features of relatively high concentration have so far been found analytically in such spectra, for example a high concentration of a peptide that is especially typical for a particular tissue state within a tissue sample. This approach has limited the method until now and prevented a broader application to those tissue states which cannot be attributed to the occurrence of one single peptide or protein.

Independently of these types of imaging methods, the targeted search for "markers" has developed as an interesting field of clinically oriented research (as shown, e.g., by W. Pusch et al., Pharmacogenetics 2003; 4, 463-476). This typically involves body fluids such as blood, urine or spinal fluid, but also tissue extracts, being processed by extraction with chromatographic phases, solid phase extraction or other selective methods into coarse fractions with a less complex analyte composition, and then characterized mass spectrometrically. The mass spectra thus obtained exhibit a more or less complex pattern of mass signals which originates from peptides and proteins. By comparing the mass spectra from samples of healthy and sick individuals, it is possible to find peptides or proteins which, individually or together, and sometimes within specified limits of the intensity ratios, are characteristic for the state of health of the individuals.

FIG. 2 shows an adapted representation from the above-cited work by W. Pusch et al. In a first step (left portion of FIG. 2), a set of training data, which contains both degenerated and normal samples, is used to discover a biomarker pattern. The clinical diagnoses of all the training data samples have been determined in advance. Bioinformatics programs then apply different mathematical algorithms to determine a predictive model on the basis of biomarker patterns of up- or down-regulated—or even unique—signals. In a second step (center portion of FIG. 2), the biomarker pattern is evaluated by classifying a set of validation data. Just like the training data, this set also contains degenerated and normal samples with known clinical diagnoses. The predictive model generated in the previous step is used to predict the class of a sample (normal or degenerated). In the illustration, the analysis is illustrated with the aid of a pattern of two biomarkers x and y. Accordingly, only two dimensions x and y have to be taken into consideration. The principle can easily be extended to a pattern of n biomarkers in an n-dimensional space, however. The resulting sample totality is then evaluated by calculating the sensitivity and specificity as well as the positive and negative predictive values, and this class prediction/independent validation leads to a better assessment of these parameters. If the quality of the predictive model is reliable, unknown samples can be classified by this model in a third step (right portion of FIG. 2).

Markers which have been obtained in this way can also be used for tissue differentiation by imaging mass spectrometry. The patent specification DE 10 2004 037 512 B4 (U.S. Pat. No. 7,873,478 B2; GB 2 418 773 B; J. Franzen, M. Schürenberg, D. Suckau) describes how the markers can be used for a graphic representation of the tissue states. This patent specification and all its content are incorporated herein by reference.

It is unfortunately often the case, however, that the quality of the individual mass spectra from the tissues is not sufficient to detect the markers with certainty. The markers are often so weak that they do not stand out sufficiently against the background, or the precision of the signal strengths is so low that the additional conditions for the ratios of different signals strengths of the markers cannot be determined with sufficient accuracy.

SUMMARY OF THE INVENTION

The detection of known markers for tissue states and tissue degenerations from mass spectra of individual pixels is often not possible with sufficient certainty because the quality of the spectra is not high enough. One aspect of the invention is a combining of mass spectra acquired in order to increase the quality so that a mass spectrometric tissue state differentiation and an identification of particular tissue states can be carried out.

Herein, the term "particular tissue state", as well as "tissue degeneration", should be understood as referring to the state of an area of a tissue section in terms of a stress, a pathological change, an infection, a change brought about by the effect of a xenobiotic, a change brought about by genetic engineering, a change caused by mutations, a particular metabolic phenotype or other change compared to a normal state of this tissue. Special emphasis is placed on regions of cancerous tissue.

The mass spectra of degenerated tissue can differ from the mass spectra of tissue which has not degenerated, but as a rule they are very similar. Slight differences are usually not characteristic of the degeneration and therefore cannot be used to identify a degeneration. The mass spectra of the degenerated tissue can, however, contain so-called "markers", which can be used to identify the tissue degeneration mass spectrometrically. Markers are specific, characteristic intensity patterns of substance signals in the mass spectrum (also called mass signal profiles or mass signal signatures), which indicate particular tissue states. The substances here may be peptides or proteins that are under- or over-expressed and thus create a pattern, but they may also include posttranslational modifications of proteins, their degradation products, endogenous metabolites or accumulations of other substances such as lipids, glycans, saccharides, or even medication in the tissue. The marker can comprise a single mass signal or several mass signals. In the case of several mass signals, the condition can be applied that the signal strengths are in a specific ratio to one another. The markers can be very weak and the characteristic ratio can have very narrow limits: therefore, to increase the quality, it is then necessary to combine the spectra in order to present the signal strengths with sufficient precision.

The invention provides a method with which, among other things, regions of the tissue with similar mass spectra are determined without the provision of any prior information ("unsupervised"), and the mass spectra of these regions are summed in order to improve the spectral quality to such an extent that the probability of being able to identify known markers for tissue states and tissue degenerations with certainty is significantly increased. Regions of similar mass spectra can be interconnected on a large scale, but can also be isolated from each other on a small scale.

Methods to determine the similarity of mass spectra with evaluation coefficients for the degree of similarity are known, such as in identity searches in spectral libraries, for example. In the following description, mass spectra are said to be similar to each other when comparison of their similarity exceeds a set threshold for the evaluation coefficient of the degree of similarity.

The invention recognizes that degenerated tissue usually forms interconnected regions which exhibit similar mass spectra. It is quite possible, however, that other regions of the same thin tissue section display the same tissue types, but which have not degenerated. One concern of this invention is to distinguish these regions.

To find the tissue regions with similar mass spectra, the mass spectra of all pixels can be compared to each other for their similarity, but this requires a very large number of similarity determinations. For a small piece of tissue with only around 100 times 100 pixels (ten thousand mass spectra), $5 \times 10^7$ (50 million) similarity determinations would be necessary. The number $n \times (n-1)/2$, which corresponds roughly to half the square of the number n of pixels, can be reduced if those mass spectra which are similar to the mass spectrum of a chosen pixel are excluded from further similarity determinations to other pixels.

Furthermore, a method is presented which requires a number of similarity determinations that is only slightly greater than the number n of pixels. To this end, a number of pixels are selected at random ("random seeds"), and a mass spectrum of each random seed is compared to the mass spectra of pixels from the immediate surroundings. This comparison with the mass spectra of the surroundings is continued in all directions as long as the similarity of the mass spectra to the original random seed is above a specified threshold or is greater than the similarity with a neighboring random seed. Initial interconnected regions of pixels with similar mass spectra are found in this way, i.e. regions which, as all experience shows, belong to the same tissue type, whether degenerated or not. The calculation can be, but does not have to be, terminated when the number of pixels in a region reaches a set value. Pixels which were not assigned to any region after the first run are assigned by repeating the method. The new random seeds are then chosen from the pixels not yet assigned. This method can be repeated as often as necessary until the interesting area of the thin tissue section has essentially been covered.

Each summed mass spectrum from an interconnected region (or from only a part of this region) is examined for the presence of the marker. Regions which unequivocally contain the marker are thus determined as belonging to the particular tissue state. The corresponding pixels or locations on the tissue surface can then be labeled accordingly in the mass spectrometric image. If several regions contain unclear indications for the marker, their mass spectra can be summed so that the improved quality increases the certainty of the marker identification. In this case also, it may be possible to determine the characteristic of the tissue state using the sum spectrum, and then assign it to the individual pixels or regions on the tissue section.

Before a search for a marker is conducted, it is also possible to determine in each case whether a tissue type is present for which the marker is actually suitable. Some markers are specific for only one or only a few tissue types.

BRIEF DESCRIPTION OF THE DRAWINGS

The invention can be better understood by referring to the following illustrations. The elements in the illustrations are not necessarily to scale, but are primarily intended to illustrate the principles of the invention (largely schematically).

DETAILED DESCRIPTION

While the invention has been illustrated and explained with reference to a number of embodiments, those skilled in the art will recognize that various changes in form and detail may be made to it without departing from the scope of the technical teaching defined in the attached patent claims.

Figure 1A:
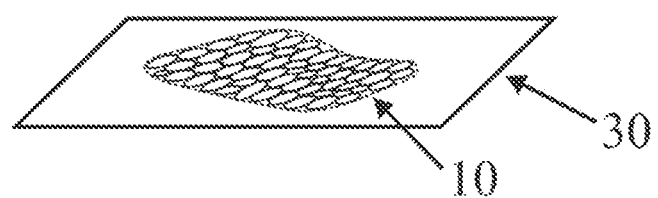
FIG. 1A is a schematic depiction of a tissue section on a specimen slide in the first step of an example of a mass spectrometric imaging method by means of MALDI time-of-flight mass spectrometry.
Figure 1B:
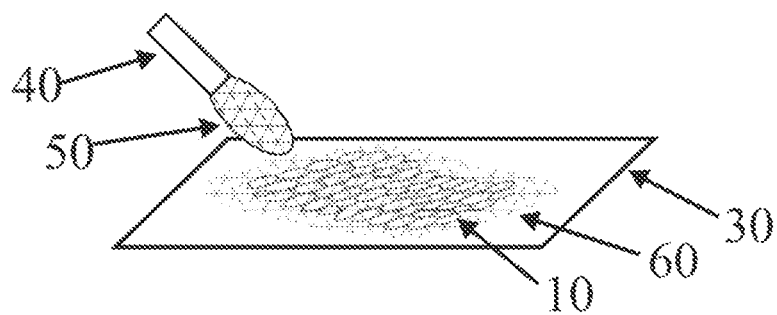
FIG. 1B is a schematic depiction of the specimen slide of FIG. 1A in a subsequent step of applying a matrix layer to the tissue section.
Figure 1C:
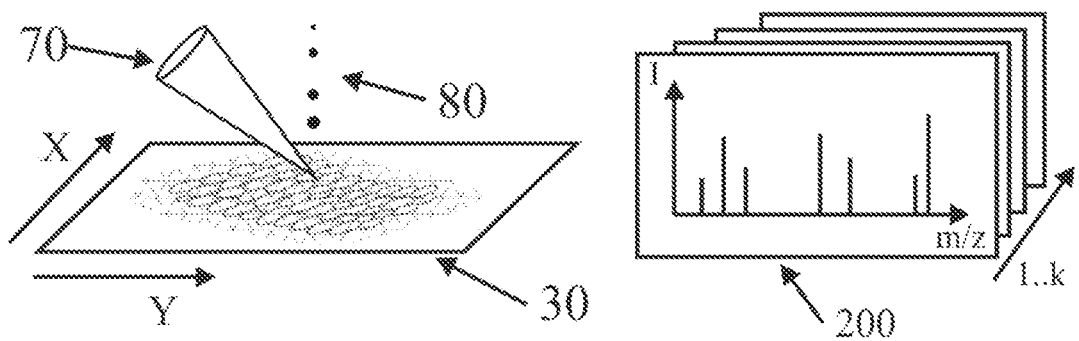
FIG. 1C is a schematic depiction of the slide of FIG. 1B in a subsequent step of scanning the tissue section with focused laser beam pulses.
Figure 2:
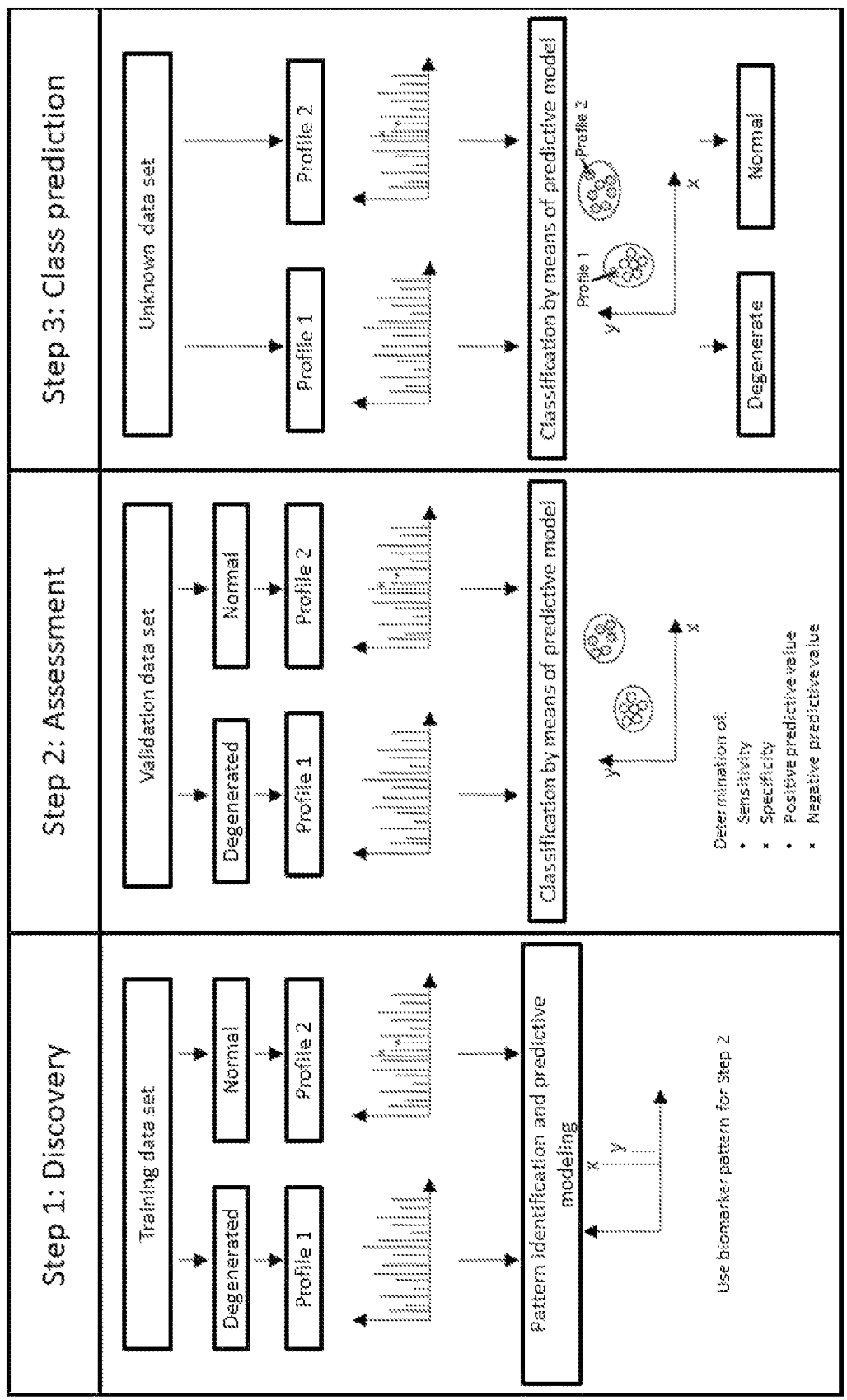
FIG. 2 is a schematic representation of the discovery and use of a biomarker pattern for the mass spectrometric identification of normal and degenerated states.

It is again pointed out here that the terms "particular tissue state" and "tissue degeneration" should be understood here as states of areas of a tissue section in terms of a stress, a pathological change, an infection, a change brought about by the effect of a xenobiotic, a change brought about by genetic engineering, a change caused by mutations, a particular metabolic phenotype or other change compared to a normal state of this tissue. For the particular tissue state, a marker should be known (for example, determined by the method shown in FIG. 2) which forms a certain, characteristic intensity pattern of mass signals in a mass spectrum of the tissue. The marker can comprise a single mass signal or several mass signals. In the case of several mass signals, the condition may be applied that the signal strengths (also called intensities or amplitudes) are in a specific ratio to one another. The marker can be a very weak mass signal, or the characteristic ratio can have very narrow limits: in order to increase the quality, it is then necessary to combine the spectra so as to make the signal strengths stand out from the background of the mass spectra with sufficient precision and to represent the ratios of the signal strengths with respect to each other with sufficient precision.

The invention recognizes the fact that tissues with these particular tissue states usually form interconnected regions. These regions exhibit similar mass spectra with respect to certain mass signal signatures or compositions of ion species, but these mass spectra do not necessarily have to be identical to a mass signal profile of a marker, however.

In a first embodiment, the invention presents a method to automatically ("unsupervised", i.e. without any further prior information) determine interconnected regions of the tissue with similar mass spectra. In pixels with similar mass spectra, some or all mass spectra of these pixels can then be summed in order to enhance the spectral quality to such an extent that the probability of identifying the known marker as being present or absent with certainty is significantly increased. As is well known, the signal-to-noise ratio and the precision of the signal strengths improve with the square root of the number of summed spectra, i.e. for the summation of four spectra by a factor of 2, for the summation of 16 spectra by a factor of 4, etc. Regions of similar mass spectra can be interconnected on a large scale, but can also be isolated from each other on a small scale.

Figure 3:
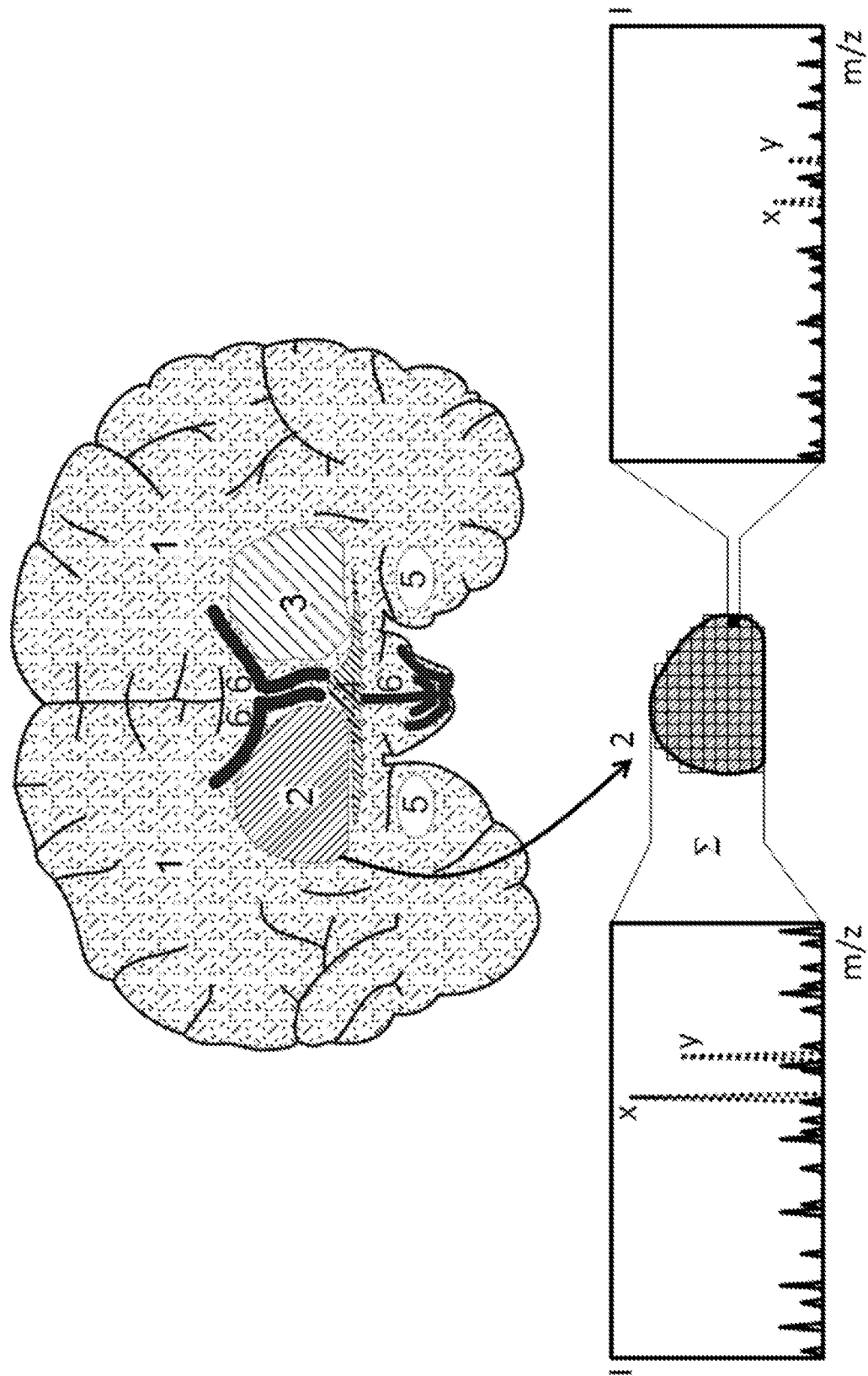
FIG. 3 is a schematic thin tissue section of a mouse brain with different tissue regions (1) to (6). After all the mass spectra of region (2) have been summed, the resulting enhanced spectral quality means that this region can, with the aid of a known marker, be recognized as degenerated (spectrum on the left), whereas the marker detection on mass spectra of individual pixels cannot permit a reliable assignment (spectrum on the right).

FIG. 3 depicts a thin tissue section through a mouse brain which consists of different tissue regions (1) to (6). The tissue region (2) can be recognized as particular or degenerated (e.g., tumorous) with the aid of the biomarkers x, y due to the enhanced spectral quality resulting from the summation of the mass spectra of several similar pixels (as shown in the spectrum on the left side of the figure), for example. In contrast, the signal-to-noise ratio of the biomarkers x, y in the mass spectrum (shown on the right side of the figure) of a single pixel of the tissue region (shaded black in the illustration) is too unfavorable to allow a reliable assignment despite the presence of the biomarkers x, y.

Methods to determine the similarity of mass spectra using evaluation coefficients for the degree of similarity are known, for example when searching for microbes with the aid of their mass spectra in libraries with reference spectra. For example, the publication by Jarman et al. (Analytical Chemistry, 72(6), 2002, 1217-1223: "An Algorithm for Automated Bacterial Identification Using Matrix-Assisted Laser Desorption/Ionization Mass Spectrometry") elucidates a computational method for the generation of reference spectra of a library and for similarity analysis between a mass spectrum of a sample under investigation and the reference spectra of a library. However, the averaged mass, the spread around the averaged mass, the average intensity, the spread around the average intensity, and the percentage frequency of the occurrence of this mass signal in the repeat spectra have to be determined for each of the reference spectra, and therefore this method is not preferred here.

For the identification of microbes, it is the masses of the signals in the mass spectrum which are crucial. The intensities of the signals are only of secondary importance. In contrast to this, different tissue states in an organism are not usually distinguished by signals being found at different masses. It is more often the case that the same mass signals are observed, but their intensities differ. Unfortunately, the signal-to-noise ratio of the signals in the individual spectra is often not sufficient to allow reliable signal detection in the individual spectrum (as shown, for example, in the spectrum on the right side of FIG. 3). It is possible to address this problem by carrying out the signal detection on an average spectrum, for example, or by determining the signal positions from the individual spectra, but then determining the intensity value for each individual spectrum at the signal positions from the raw data, for example by determining the average value or the maximum value via a mass interval around the signal position.

As the basis for a similarity determination of two or more mass spectra, each mass spectrum can be considered as a vector of identity values, for example. This vector can contain all the mass values of the spectrum; however, a prior feature detection will usually be used to select only those mass values at which a signal is actually present above the omnipresent background (so-called "Peak Picking", see for example DE 198 08 584 C1; GB 2 334 813 B; U.S. Pat. No. 6,288,389 B1; J. Franzen). All known methods of determining similarities of vectors can then be used to determine a similarity value. These are, for example, the Minkowski distance, or specifically Euclidian distance and city-block (or Manhattan) distance, the cosine distance, Pearson's correlation and others.

To find the tissue regions with similar mass spectra, the mass spectra of all n pixels on a tissue section can be examined against each other for their similarity. This procedure leads to a very high number of similarity determinations. For a small piece of tissue with only around 100 times 100 pixels (ten thousand mass spectra), around $5 \times 10^7$ (50 million) similarity determinations are then already necessary. The number m required is then represented by the expression $m=n \times (n-1)/2$, which corresponds roughly to half the square of the number n of pixels. Such a large number of spectral comparisons requires a long computing time, which can be achieved by modern computers. However, the computation time can be advantageously reduced if mass spectra of the comparison pixels of a starting pixel whose similarity is above a specified threshold value are excluded from further similarity determinations.

To reduce the computing time further, a method of the invention requires a number of similarity determinations that is only slightly greater than the number n of pixels. To this end, a number of pixels are selected at random ("random seeds"), and the mass spectrum of each random seed is compared with the mass spectra of the pixels from the immediate surroundings. This comparison with the mass spectra from the surroundings is continued in all directions as long as the similarity of the mass spectra to the original random seed is above a specified threshold value or is greater than the similarity with a neighboring random seed. Initial interconnected regions of pixels with similar mass spectra are found in this way, i.e. regions which, as all experience shows, belong to the same tissue type, whether degenerated or not.

The calculation can be, but does not have to be, terminated when the number of pixels in a region reaches a set value. Pixels which were not assigned to any region after the first run are assigned by repeating the method. The new random seeds are then chosen from the pixels not yet assigned. This method can be repeated as often as necessary until the area of interest of the thin tissue section has essentially been covered.

When all regions have essentially been found, the mass spectra from different interconnected regions are examined for similarities in order to determine isolated regions of the same tissue.

Markers for abnormal tissue states can be specific only for single tissue types. Before a search for a known marker is conducted, it is therefore necessary to determine whether a tissue type is present for which it is certain that the marker is actually suitable.

If regions are found with tissue types for which the marker can be used, mass spectra from such a region are now summed for at least as long as the quality of the spectra is sufficiently high to be able to identify the presence of the marker with certainty. If the number of mass spectra in this region is not sufficient for a definite identification, it is possible to determine in general whether the marker is present with some probability or whether it is not present at all. This check can be carried out for all regions of the same tissue type. The mass spectra of those regions where the marker is probably present can then be summed. The spectral quality can thus be specifically enhanced until it is certain that the tissue of these regions is either normal or degenerated, i.e. is in a particular state.

The result can be that only some regions of this tissue type exhibit the marker for an abnormal tissue state, while other regions of this tissue type are in a normal state. This situation tends to be rather unusual, however, because tissue which is infected, stressed or in other ways different usually differs from normal tissue in the mass spectra outside the markers also, albeit only slightly, so that interconnected tissue regions with similar mass spectra are usually in the same state.

Another embodiment of the fundamental method consists in first determining regions of the same tissues with known methods, and then summing so many mass spectra from these regions that the spectral quality is sufficiently high to be able to identify known markers. Such a method to determine tissue regions by edge-preserving smoothing of images of individual masses is known from DE 10 2010 009 853 B4 (T. Alexandrow; corresponding to U.S. Pat. No. 8,605,968 B2 and GB 2 478 398 B). Tissue regions can also be determined using optical microscopy methods. To this end, the matrix layer can be removed after the mass spectra have been acquired, and the thin tissue section can be stained with conventional methods and examined under a microscope (see S. O. Deininger and A. Walch: DE 10 2008 023 438 B4, EP 2 124 192 B1).

A further embodiment of the fundamental method uses reference mass spectra for tissue types from a library as the starting point for a search for regions of similar mass spectra. A reference spectrum for a tissue type is chosen for which a marker is known for the tissue stress sought. For this reference mass spectrum, similar mass spectra are sought in the tissue. Mass spectra from the tissue regions found here can again be summed, just like in the method described above, to thus obtain such a high spectral quality that the known marker becomes identifiable.

All the described methods to identify tissue in particular states start with the creation of a thin tissue section, preferably from a deep frozen piece of tissue or a block of tissue embedded in an organic solid material (e.g. paraffin) and chemically fixed (e.g. formalin-fixed), using a microtome. The thin tissue section is placed onto a suitable support. The support can be a glass specimen slide, for example, whose surface is provided with a transparent, but conducting surface coating for use in the mass spectrometer. Other supports, such as metal supports, can also be used, however. Glass specimen slides are especially suitable for the above-mentioned method for the identification of tissue regions under an optical microscope. Depending on the desired substance class, it may be necessary to carry out a spatially resolved enzymatic reaction on the tissue surface. For this, the enzyme is usually sprayed on.

The thin tissue section is then sprayed with a solution of a suitable matrix substance for the ionization by matrix-assisted laser desorption. The spraying can, for example, be conducted on a device which moves the specimen slide underneath the spray jet in such a way that a uniform spray coating is produced. Care has to be taken here that the positional accuracy of the substances is not impaired by the liquid running after it is sprayed on. Most suitable is an intermittent spraying with intermediate drying, as presented in DE 10 2006 019 530 B4 (M. SchUrenberg; corresponding to U.S. Pat. No. 7,667,196 B2 and GB 2 437 623 B). In this process, the crystallizing matrix substance takes up such substances from the thin section which can be embedded in the crystals themselves or in grain boundaries between the crystals during the crystallization.

The choice of matrix substance can greatly influence which biomolecules lead to signals in the spectra. For example. proteins may be prepared with 2,5-dihydroxybenzoic acid (DHB) or sinapic acid (SA), peptides with α-cyano-4-hydroxycinnamic acid (CHCA), nucleic acids with 3-hydroxypicolinic acid (3-HPA), and saccharide-bearing structures with DHB or trihydroxyacetophenone for MALDI MS analysis. The samples are then introduced into the mass spectrometer and the mass spectra are acquired.

A pixel size is first specified on the basis of the tissue structure, which is essentially known. Let us assume here that a section measuring 5 millimeters by 5 millimeters from a finely structured tissue is to be investigated. A pixel size of 50 micrometers by 50 micrometers is suitable for this, for example. The pixel size should be as large as possible, but on the other hand it should overlap as few structural boundaries as possible.

Several methods are possible to acquire the mass spectra: (i) raster scan over one individual pixel at a time with a finely focused laser beam, including tissue type-independent summation of the mass spectra, (ii) acquisition of the mass spectra with a laser beam whose focus corresponds to the pixel size, including summation of several successively acquired mass spectra from the same pixel area, or (iii) a mixture of the aforementioned methods. Whichever method is selected, it is important that a tissue type-independent sum spectrum which is already of high quality at the beginning is available for each pixel.

The raster scan is discussed only briefly here by way of example. The raster scan consists of a pixel-by-pixel acquisition of the mass spectra, where in each spot of the tissue sample one or preferably several acquisitions of the mass spectrum are carried out by the finely focused laser beam. The mass spectra of all the spots of a pixel are summed, irrespective of the tissue type, in order to achieve a higher dynamic range of measurement and also to improve the statistics of the mass signals. The diameters of the "spots" roughly correspond to the diameter of the laser spot, i.e. the diameter of the laser beam on the sample, which can be set by focusing. Solid-state lasers in mass spectrometers allow focal diameters down to around 5 micrometers; mass spectra of 100 raster spots can therefore be acquired in one pixel of 50-micrometer edge length. If four mass spectra can be acquired at each raster spot before the material of the thin tissue section is used up, we obtain the sum from 400 mass spectra in each pixel. The sum spectra are saved for each pixel. For a square of the tissue surface with an edge length of five millimeters, this means that 10,000 sum-mass spectra are measured, each summed from 400 individual mass spectra. With a ten kilohertz acquisition rate, the acquisition of the 4 million individual mass spectra takes around seven minutes.

The pixels generally form patterns arranged in a square, parallelogram or honeycomb, but of course they may instead follow a specific morphology of the sample, as would be helpful for an axon of a ganglion several millimeters in length, for example. The only important aspect here is that the pixel size is suitably matched to the size of the area to be analyzed or to the expected anatomical structure.

Ions generated spot by spot by MALDI can be examined with mass spectrometers using a wide variety of mass analyzers. Time-of-flight analyzers (time-of-flight mass spectrometers; TOF-MS) with or without an ion reflector are usually used. It is also possible to use time-of-flight mass spectrometers with orthogonal ion injection (OTOF-MS), however. Fourier transform ion cyclotron resonance mass spectrometers (FT-ICR) are also being increasingly used.

After the measurements, complete mass spectra are then available for each pixel. The above-described methods according to the invention are then applied to this data in order to determine areas of degenerated tissue. The tissue states can then be graphically displayed on the screen in the usual way.

In summary, the invention provides methods of searching for tissue degenerations in histological samples using mass spectra acquired with spatial resolution from thin tissue sections and for visualizing their spatial distribution. Markers are known for the tissue degenerations, but often cannot be identified in individual mass spectra with sufficient certainty. The invention is characterized by the fact that regions with similar mass spectra are sought across the tissue surface by means of similarity determinations, and that so many mass spectra from regions of similar mass spectra are summed that the quality of the summed mass spectrum is sufficient for a definite identification of the marker or markers.

For the similarity determination, it is preferable to use methods which provide a similarity parameter. A region of similar mass spectra is then characterized by the fact that the mass spectra have a similarity with respect to each other which is above a set threshold for the similarity parameter.

It is preferable for the tissue surface to be subdivided into pixels, while the pixel size is chosen to be appropriate for the tissue structure. Each pixel is preferably sampled using the raster scan method, and the mass spectra of one pixel are summed, irrespective of the tissue type, to form spatially resolved mass spectra which are then examined for degenerated tissue.

A first method is characterized by the fact that the mass spectra of each individual pixel are examined against all the mass spectra of the other pixels for similarity, resulting in interconnected regions with similar mass spectra. This results in a very high number of spectral comparisons, however. The number of similarity determinations can be reduced if those pixels whose mass spectra are similar to that of an original pixel above the similarity threshold are excluded from further similarity determinations with respect to mass spectra of other pixels.

A second method is characterized by the fact that the search of a first region starts from an arbitrarily selected pixel and entails determining the similarity of the mass spectra to the mass spectra of all neighboring pixels. The search continues in all directions until the boundary is reached in each case, where the mass spectra are no longer similar. The search of a second region then takes place, starting with a selected pixel outside the first region, and so on, until the tissue area of interest is practically completely covered by regions with mass spectra which are similar to each other.

Furthermore, the invention provides a method of searching for tissue degenerations which is characterized by the fact that regions with the same types of tissue are sought across the tissue surface using known methods, e.g. optical microscopy, and that so many mass spectra are summed from the regions that the quality of the summed mass spectrum is sufficient for a definite identification of the marker or markers.

A further method of searching for tissue degenerations in histological samples using mass spectra of thin tissue sections acquired with spatial resolution is characterized by the fact that regions of this tissue type are identified by similarity determinations of the local mass spectra with a reference mass spectrum for one tissue type across the tissue surface, and that so many mass spectra from the regions are summed that the quality of the summed mass spectrum is sufficient for a definite identification of the marker or markers.

The spatial distribution of the tissue states can be represented graphically, for example on a screen. For this, gray scales or false colors can be used, as is customary.

In addition to the MALDI ionization described in detail above, other types of ionization can also be used with the methods from mass spectrometric imaging described here, for example desorption electrospray ionization (DESI) or secondary ion formation by primary ion bombardment (secondary ion mass spectrometry, SIMS).

The invention has been described above with reference to different, specific example embodiments. It is to be understood, however, that various aspects or details of the embodiments described can be modified without deviating from the scope of the invention. In particular, features and measures disclosed in connection with different embodiments can be combined as desired. Moreover, the above description serves only as an illustration of the invention and not as a limitation of the scope of protection, which is exclusively defined by the appended claims, taking into account any equivalents which may possibly exist.

The invention claimed is:

1. A method of searching for one or more particular tissue states in a tissue section from a histological sample, comprising:
   acquiring mass spectra with spatial resolution over a plurality of pixels from the tissue section;
   visualizing a spatial distribution of the one or more particular tissue states, where the one or more particular tissue states are indicated by one or more known markers:
   identifying and locating first regions of the tissue section representing different types of tissue and second regions of the tissue section representing a same type of tissue using optical microscopy; and
   for the second regions of the same tissue type, summing the mass spectra from different pixel locations in those second regions to produce a summed mass spectrum which is investigated to determine whether at least one of said one or more known markers is present or absent in the regions corresponding to the summed mass spectra.

2. The method according to claim 1, wherein said first and second regions are identified by optical microscopy after the mass spectra have been acquired.

3. The method according to claim 2, wherein identifying and locating the first and second regions of the tissue section using optical microscopy comprises removing a matrix layer from the tissue section after the mass spectra have been acquired, staining the matrix-depleted tissue section and examining it under a microscope.

4. The method according to claim 1 wherein the tissue section is deposited on a glass specimen slide for the step of identifying and locating the first and second regions of the tissue section using optical microscopy.

5. The method according to claim 1, wherein said mass spectra acquired with spatial resolution are acquired from a surface of the tissue section by a process that includes dividing the tissue surface into pixel locations, wherein each of said pixel locations has a size that allows the acquisition of several individual mass spectra, and wherein a pixel sum spectrum is formed for each pixel location from these individual mass spectra.

6. The method according to claim 1, wherein at least one of said one or more markers is a specific, characteristic intensity pattern of substance signals in the summed mass spectrum.

7. The method according to claim 6, wherein the substance is at least one of peptides, proteins, lipids, glycans, saccharides, and medication in the tissue.

8. The method according to claim 6, wherein a marker comprises at least one mass signal.

9. The method according to claim 8, further comprising applying a condition to a marker having a plurality of mass signals that their signal strengths are in a specific ratio to one another.

10. The method according to claim 1, wherein the mass spectra are acquired using one of a time-of-flight (TOF) mass spectrometer with or without ion reflector, a time-of-flight (TOF) mass spectrometer with orthogonal injection (OTOF), a Fourier transform ion cyclotron resonance (FT-ICR) mass spectrometer, a MALDI mass spectrometer, a DESI mass spectrometer, or a SIMS mass spectrometer.

11. The method according to claim 1, further comprising representing the spatial distribution of the one or more tissue states graphically by one of a gray scale and false color image of the tissue section.

12. A method of searching for one or more particular tissue states in a tissue section from a histological sample, comprising:
   acquiring mass spectra with spatial resolution over a plurality of pixels from the tissue section;
   visualizing a spatial distribution of the one or more particular tissue states, where the one or more particular tissue states are indicated by one or more known markers;
   identifying and locating first regions of the tissue section representing different types of tissue and second regions of the tissue section representing a same type of tissue; and
   for the second regions of the same tissue type, summing the mass spectra from different pixel locations in those second regions to produce a summed mass spectrum which is investigated to determine whether at least one of said one or more known markers is present or absent in the regions corresponding to the summed mass spectra.

13. The method according to claim 12, wherein identifying and locating the first and second regions of the tissue section comprises providing a similarity parameter for the mass spectra.

14. The method according to claim 13, wherein identifying and locating the second regions of the tissue section that are of the same tissue type comprises identifying and locating regions where the similarity parameter exceeds a set threshold value.

15. The method according to claim 12, wherein said mass spectra acquired with spatial resolution are acquired from a surface of the tissue section by a process that includes dividing the surface of the tissue section into pixel locations, wherein each of said pixel locations has a size that allows the acquisition of several individual mass spectra, and wherein a pixel sum spectrum is formed for each pixel location from these individual mass spectra.

16. The method according to claim 15, wherein a pixel sum spectrum of an individual pixel is examined for similarity with all the pixel sum spectra of the other pixels.

17. The method according to claim 15, wherein a number of pixel-by-pixel similarity determinations is minimized by excluding from further similarity determinations those pixels whose pixel sum spectra are similar to a pixel sum spectrum of an original pixel above a similarity threshold.

18. The method according to claim 12, wherein the mass spectra acquired with spatial resolution are compared to a reference mass spectrum which contains mass signals characteristic for a tissue type in order to determine their similarity to it.

19. The method according to claim 12, further comprising considering each mass spectrum as a vector of intensity values and using a method of determining similarities of vectors thereon in order to provide a similarity parameter used in said identifying and locating of the first and second regions of the tissue section.

20. The method according to claim 19, wherein all mass values are contained in the vector of intensity values.

21. The method according to claim 19, wherein a peak picking, comprising a feature selection to select only those mass values at which a signal is actually present, is executed on the mass spectra before the method of determining similarities of vectors is used.

22. The method according to claim 19, wherein the method of determining similarities of vectors comprises computing one of the Minkowski distance, Euclidian distance, city-block distance, Manhattan distance, cosine distance and Pearson's correlation.

23. The method according to claim 12, wherein at least one of said one or more markers is a specific, characteristic intensity pattern of substance signals in the summed mass spectrum.

24. The method according to claim 23, wherein the substance is at least one of peptides, proteins, lipids, glycans, saccharides, and medication in the tissue.

25. The method according to claim 23, wherein a marker comprises at least one mass signal.

26. The method according to claim 25, further comprising applying a condition to a marker having a plurality of mass signals that their signal strengths are in a specific ratio to one another.

27. The method according to claim 12, further comprising representing the spatial distribution of the one or more tissue states graphically by one of a gray scale and false color image of the tissue section.

28. The method according to claim 12, wherein identifying and locating the first and second regions of the tissue section comprises identity searches in a spectral library containing reference spectra, and wherein the method further comprises choosing a reference spectrum for a tissue type for which at least one of the said one or more markers is known for a tissue stress sought.

* * * * *